United States Patent
Zuercher et al.

[11] Patent Number: 5,818,237
[45] Date of Patent: Oct. 6, 1998

[54] APPARATUS FOR ENVELOPE DETECTION OF LOW CURRENT ARCS

[75] Inventors: Joseph C. Zuercher, Brookfield, Wis.; Raymond W. MacKenzie, Baldwin Borough, Pa.; Steven C. Schmalz, Greenfield, Wis.

[73] Assignee: Eaton Corporation, Cleveland, Ohio

[21] Appl. No.: 661,278

[22] Filed: Jun. 10, 1996

[51] Int. Cl.$^6$ .............................. G01R 31/08; H02H 3/00
[52] U.S. Cl. .................. 324/536; 324/520; 324/521; 324/535; 361/42; 361/93
[58] Field of Search ................... 324/520, 521, 324/535, 536, 541, 544, 547, 551, 555, 455, 456, 72, 127; 361/42, 45, 46, 63, 93, 94, 96, 97

[56] References Cited

U.S. PATENT DOCUMENTS

| | | | |
|---|---|---|---|
| 3,515,943 | 6/1970 | Van Cortlandt Warrington | 317/27 |
| 4,376,243 | 3/1983 | Renn et al. | 219/514 |
| 4,949,214 | 8/1990 | Spencer | 361/95 |
| 5,121,282 | 6/1992 | White | 361/42 |
| 5,185,687 | 2/1993 | Beihoff et al. | 361/45 |
| 5,208,542 | 5/1993 | Tennies et al. | 324/544 |
| 5,223,795 | 6/1993 | Blades | 324/536 |
| 5,224,006 | 6/1993 | MacKenzie et al. | 361/45 |
| 5,307,230 | 4/1994 | Mackenzie | 361/96 |
| 5,459,630 | 10/1995 | MacKenzie et al. | 361/45 |

FOREIGN PATENT DOCUMENTS 1210847  9/1986  Canada.

Primary Examiner—Diep N. Do
Attorney, Agent, or Firm—Martin J. Moran

[57] ABSTRACT

Arcing faults in an ac current are detected by apparatus which is responsive to a predetermined randomness in step increases in the current to eliminate false tripping caused by regularly occurring discontinuities produced by loads such as dimmers. A signal conditioner generates a bandwidth limited di/dt signal having pulses produced by the step increases in current. In one embodiment, a first tracking circuit tracks the envelope of the di/dt signal with a first time constant. A second tracking circuit also tracks the di/dt envelope, but with a second, shorter time constant. An arcing fault is indicated if the second tracking signal falls to a predetermined fraction of the fist tracking signal. This circuit may be used alone to detect arcing faults or to increase the sensitivity to arcing faults over dimmers of a circuit which responds to a time attenuated integrated valve of the pulses in the di/dt signal. In another embodiment, the di/dt envelope signal is subtracted from the magnitude of the pulses before they are applied to the time attenuated integrator, but with the subtraction time delayed to preclude attenuation of the first pulse.

11 Claims, 4 Drawing Sheets

APPARATUS FOR ENVELOPE DETECTION OF LOW CURRENT ARCS

BACKGROUND OF THE INVENTION

1. Field of the Invention

This invention relates to apparatus for detecting arcing faults in ac electrical systems, and in particular to such apparatus which discriminates between arcing faults and conditions generated by certain loads which have some of the characteristics of an arcing fault.

2. Background Information

It has become recognized that conventional overcurrent protection devices for ac electrical systems such as circuit breakers and overload relays typically do not respond to arcing faults. Such faults often have a high resistance so that the fault current is below the instantaneous trip current of such protection devices. Arcing faults in ac systems also tend to be intermittent so that they do not generate the time integrated values of current needed to activate the delayed trip feature in the typical circuit protection.

A common approach to arcing fault detection recognizes that the arc current is considerably distorted from a pure sine wave. For instance, it contains considerable high frequency noise. In addition, there can be intervals of no current and/or periods of short circuit current. Devices which combine various of these characteristics of arc current have been proposed for arc detectors. Some of them require microcomputers to apply the various criteria to the current waveform. Generally, this makes such detectors too expensive for widespread use. In addition, many common loads have capacitors or transformers on their inputs which filter the high frequency noise.

Another approach to arc fault detection relies on the fact that an arc between spaced conductors or a gap in a conductor can only be struck when the voltage rises to the break down voltage across the space or gap. Thus, these detectors respond to the step increase in current produced by arc initiation. Such a detector is described in U.S. Pat. No. 5,224,006. In order to avoid false trips produced by the inrush currents at turn on of some typical loads, another detector of this type described in U.S. Pat. application Ser. No. 08/336,721, filed Nov. 9, 1994, looks for a plurality of step increases in current within a certain time interval characteristic of an arcing fault which repetitively strikes and is interrupted. A further improvement on this type of detector, which generates a time attenuated integration of pulses representative of step increases in current such as those generated by arcing faults, is described in U.S. Pat. application Ser. No. 08/471,132, filed on Jun. 6, 1995. U.S. Pat. No. 5,691,869.

Any arcing fault detector must be able to discriminate between a true arcing fault and waveform distortion produced by normal loads. One such load is a dimmer. A dimmer phases back the half cycles of the ac voltage creating repetitive step increases in current. The above-described arcing fault detectors which respond to a plurality of step increases in current must have their sensitivities reduced to avoid a false response to dimmers. Adding to the problem, a dimmer energizing a tungsten lamp can generate inrush pulses with an amplitude ten times steady state current when the filament is cold.

There is a need, therefore, for an improved arcing fault detector.

There is a need for such an arcing fault detector with improved immunity to false trips.

More particularly, there is a need for an arcing fault detector which responds to repetitive arc initiation but can discriminate currents produced by a dimmer, and especially a dimmer supplying a cold tungsten load.

SUMMARY OF THE INVENTION

These needs and others are satisfied by the invention which is directed to apparatus for detecting arcing faults in an ac electrical system. The apparatus tracks the envelope of a sensed current signal which is representative of the current flowing in the ac electrical system and generates an output indicative of an arcing fault in response to a predetermined randomness in this envelope. This apparatus operates on the principle that while a dimmer also generates step increases in current, the step increases are repeated every half cycle unlike the step increases caused by an arcing fault which are random.

In accordance with one embodiment of the invention, the tracking means which tracks the envelope of the sensed current signal comprises first tracking means which tracks the current signal with a first time constant to generate a first tracking signal, and second tracking means tracking the sensed current signal with a second time constant which is shorter than the first time constant to generate a second tracking signal. Response means compares the first and second tracking signals and generates an output signal when the second tracking signal decays to a predetermined fraction of the first tracking signal. As a dimmer generates a step increase in current on each half cycle, the time constants and the fraction can be selected such that the second tracking signal never falls to the predetermined fraction of the first tracking signal in response to a dimmer. On the other hand, the random repetition of the step increases in the case of an arcing fault produces intervals where the second tracking signal will fall to the predetermined fraction of the first tracking signal and produce an output. In order to prevent an output when a dimmer is turned off, the response means also includes means which require the second tracking signal to fall to the predetermined fraction of the first tracking signal a predetermined number of times within a prescribed interval as would occur in the case of an arcing fault.

As another aspect of the invention, envelope detection can be combined with the previously discussed technique of generating a time attenuated accumulation of pulses in a di/dt sensed current signal. In order to avoid false tripping on a dimmer, which also generates repeated step increases in current, it has been necessary to set the threshold for such arcing fault detectors high enough to avoid counting step increases produced by a dimmer. In accordance with this aspect of the invention, the sensitivity to arcing faults is increased by additionally incrementing the time attenuated accumulation in response to random pulses. Again, random pulses are indicated when the fast envelope tracking signal falls to the predetermined fraction of the slow envelope tracking signal.

As a further aspect of the invention, the envelope of the sensed signal can be subtracted from the pulses of the di/dt sensed current signal with the resulting difference signal applied to the time attenuated accumulation circuit.

BRIEF DESCRIPTION OF THE DRAWINGS

A full understanding of the invention can be gained from the following description of the preferred embodiments when read in conjunction with the accompanying drawings in which:

FIG. 1a illustrates a current waveform subject to arcing faults.

FIG. 1b illustrates the first derivative of the current waveform of FIG. 1a.

FIG. 1c illustrates a first envelope tracking signal tracking the signal of FIG. 1b with a first, slow time constant.

FIG. 1d illustrates a second envelope tracking signal tracking the signal of FIG. 1b with a second, fast time constant.

FIG. 1e illustrates an output signal which goes high when the second envelope tracking signal of FIG. 1d falls below the first envelope tracking signal of FIG. 1c.

FIG. 2a illustrates a current waveform of a dimmer operating in a half wave mode for energizing a cold tungsten load.

FIG. 2b illustrates the pulse waveform which is the first derivative of the waveform shown in FIG. 2a.

FIG. 2c illustrates a first, envelope tracking signal tracking the signal of FIG. 2b with a first, slow time constant.

FIG. 2d illustrates a second, envelope tracking signal tracking the signal of FIG. 2b with a second, fast time constant.

FIG. 2e illustrates an output signal generated from the signals of FIGS. 2c and 2d.

DESCRIPTION OF THE PREFERRED EMBODIMENTS

Figure 1:
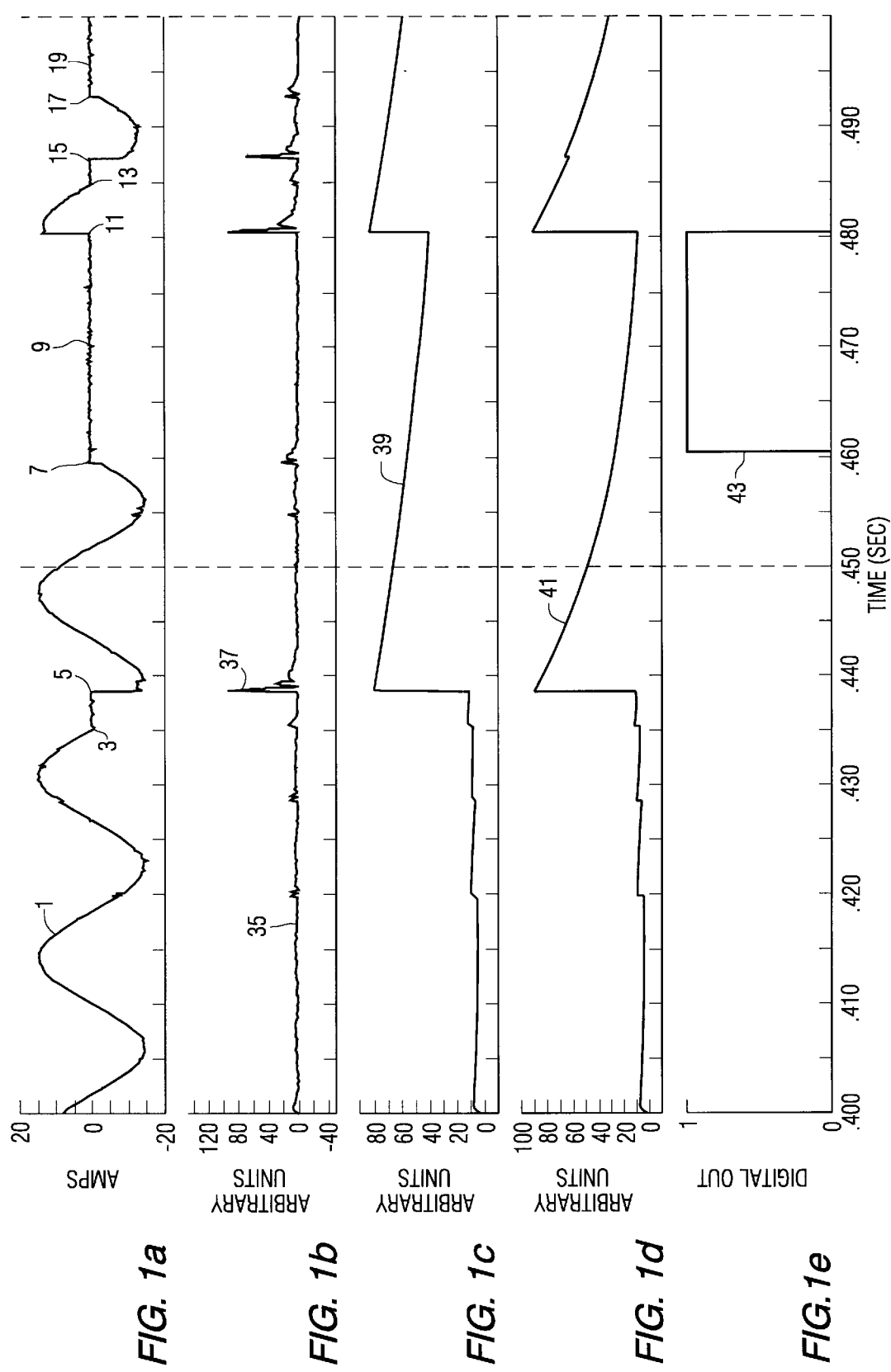

Referring to FIG. 1a which illustrates a current waveform 1 in a typical ac electrical system subject to a series arcing fault, it can be seen that a series of random discontinuities occur in the current. For instance, a gap in the conductor carrying the current, such as can be caused by cutting of the conductor, results in the current terminating at the zero crossing 3 and remaining at zero until the voltage rises sufficiently to restrike an arc across the gap. This causes the current to rise rapidly as a step function at 5 and then resume a sinusoidal pattern which can continue even through zero crossings. If conditions are reached where the arc cannot be maintained, another discontinuity occurs such as at 7. In the example shown an open circuit is maintained at 9 until the voltage reaches the arc voltage and the voltage the arc is restruck at 11. In this example, the arc is extinguished at the zero crossing 13, but is restruck again on the next half cycle at 15. The voltage then falls below the arcing voltage at 17 resulting in another open circuit condition at 19. The current waveform shown in FIG. 1a is an example of a typical current waveform in an ac circuit subject to arcing, but as can be appreciated, there are an infinite number of other patterns of discontinuities that can occur in such a circuit. The purpose of FIG. 1a is to illustrate that these discontinuities occur randomly.

Figure 2:
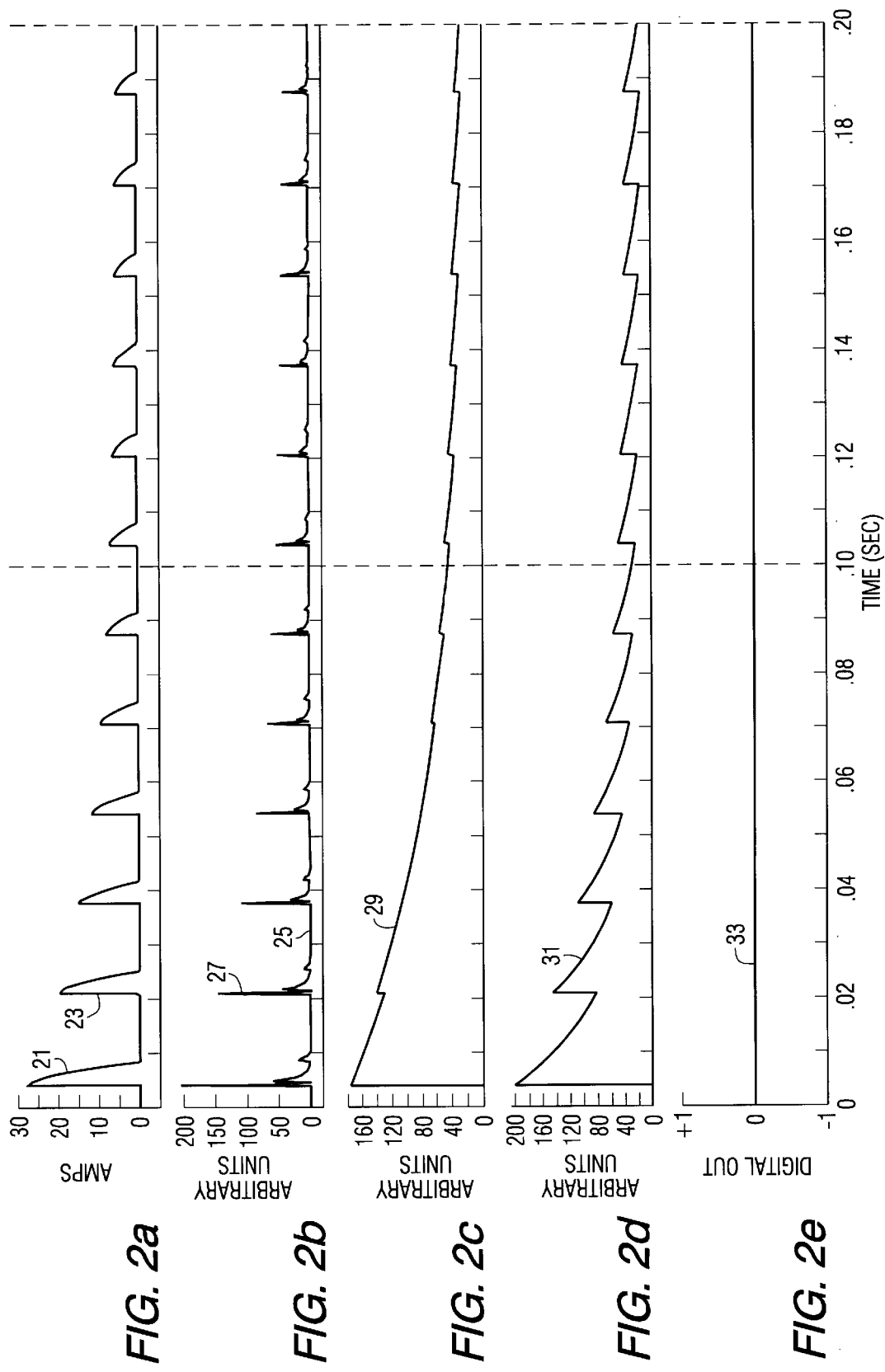

As discussed above, certain types of arc detecting circuits such as that described in U.S. application Ser. No. 08/336,721, filed on Nov. 9, 1994, look for the step increases in the current caused by the arcing fault and provide an indication of an arcing fault when a predetermined number of such step increases occur within a given time interval. As also mentioned above, there are certain types of loads which can also produce step increases in the ac current. One of the most troublesome for these arc detecting circuits is the dimmer. FIG. 2a shows a current waveform 21 produced in an ac circuit by a dimmer operating on a slightly less than 50% duty cycle to energize a cold tungsten filament. A half wave dimmer, which is the worst case is shown in FIG. 2a. It can be readily appreciated that a full wave dimmer would produce a mirror waveform for the half cycles of opposite polarity. In any event, it can be seen that such increases in current occur such as at 23 when the dimmer switch turns on. As the dimmer switches on at the same phase angle for each cycle of the ac current, the step increases 23 occur at regular intervals. In the example shown in FIG. 2a, the dimmer is energizing a cold tungsten filament so that it can be seen that the amplitude of the current is initially very high but decays slowly on successive half cycles to a steady state amplitude as the filament warms up.

Current arcing fault detectors which count the step increases in current which occur in a given time interval to detect an arcing fault, must have their sensitivity decreased so that they do not respond to the step increases in current caused by a dimmer such as shown in FIG. 2a. This penalty in sensitivity can be quite high if the inrush currents caused by a cold tungsten filament are not to cause to a false trip.

The present invention provides an improvement in series arcing fault detectors by taking advantage of the fact that the step increases caused by an arcing fault are random in time as opposed to the regular step increases caused by a dimmer. This is accomplished by detecting randomness in the envelope of the current signal. In particular, the current signal is differentiated to generate a di/dt signal containing pulses in response to step increases in current. A first tracking circuit tracks the di/dt signal with a first time constant. The di/dt signal is also tracked by a second tracking circuit having a second time constant which is shorter than the first time constant to generate a second tracking signal. These two tracking signals are compared and if the second, faster decaying tracking signal reaches a predetermined fraction of the first tracking signal, an output signal indicative of arcing fault is generated. The time constant and fraction are selected such that the repetitively occurring steps in a dimmer current signal regularly reset the tracking circuits so that the second tracking signal never decays to the specified fraction of the first tracking signal. This is illustrated by FIGS. 2b–2d where FIG. 2b illustrates the di/dt signal 25 having a series of regularly spaced pulses 27. FIG. 2c illustrates the first tracking signal 29 which decays at the slower rate and is reset by each of the recurring pulses. Similarly, FIG. 2d illustrates the second tracking signal 31 which, as can be seen, decays more rapidly than the first tracking signal, but is repetitively reset so that it never decays to the selected fraction in the example (½) of the first tracking signal amplitude. Thus, as can be seen by FIG. 2e, the output signal 33 remains at zero.

Turning to FIG. 1b, it can be seen that the di/dt signal 35 has randomly spaced pulses 37 so that the first tracking signal 39 shown in FIG. 1c and the second tracking signal 41 shown in FIG. 1d decay for a long enough period of time that the second tracking signal 41 falls below ½ the amplitude of the first tracking signal thereby causing the output signal 43 in FIG. 1d to go high.

Figure 3:
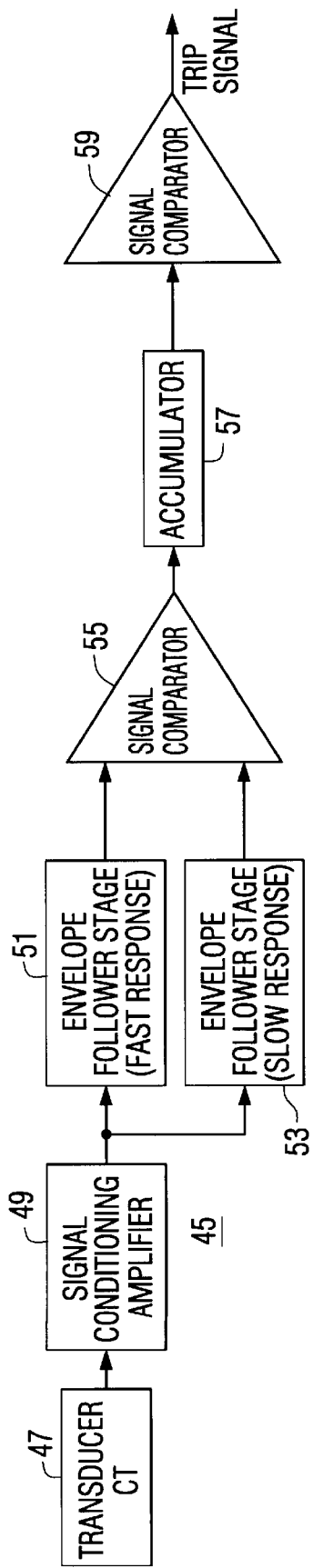
FIG. 3 is a circuit diagram in block form of an arcing fault detector in accordance with a first embodiment of the invention.

FIG. 3 is a circuit diagram in block form of an envelope tracking arcing fault detector 45 in accordance with the invention. This envelope tracking arcing fault detector 45 includes a transducer 47 which senses the current flowing in the ac circuit. In the illustrative circuit, this sensor 47 is a current transformer which generates a di/dt rate of change of current signal. The di/dt signal is bandwidth limited and full wave rectified by a signal conditioning amplifier 49 to produce the pulse signals illustrated in FIGS. 1b and 2b. The pulse signal is applied to a first envelope tracking circuit 51 having a first time constant which produces a slow response, first envelope tracking signal, and a second envelope tracking circuit 53 having a second time constant which produces the fast response, second envelope tracking signal illustrated by FIGS. 1d and 2d, respectively. These first and second tracking signals produced by the tracking circuits 51 and 53 are applied to a comparator 55 which generates an output signal if the second tracking signal generated by the tracking circuit 53 falls to a selected fraction (½ in the example) of the first tracking signal. In order to avoid false indications such as might be caused by turning off of the dimmer, an accumulator 57 produces a time integration of the output of the signal comparator 55. If the time attenuated integration produced by the accumulator 57 reaches a preset level determined by the signal comparator 59, an arcing fault output signal is generated. In effect, the accumulator 57 and comparator 59 generate the output signal if the fast tracking signal falls to the predetermined fraction of the first tracking signal a predetermined number of times within a predetermined timing interval. As an example, an arcing fault signal can be generated if the fast tracking signal falls to ½ the amplitude of the slow tracking signal 6 times within 1 second.

Envelope detection can be used alone, as described in connection with the circuit of FIG. 3, for detecting arcing faults and discriminating them from waveforms caused by dimmers. It is advantageous, however, to combine this envelope detection with the previously described arc detection circuits which count step increases over time to improve their sensitivity while rejecting false trips caused by dimmers.

Figure 4:
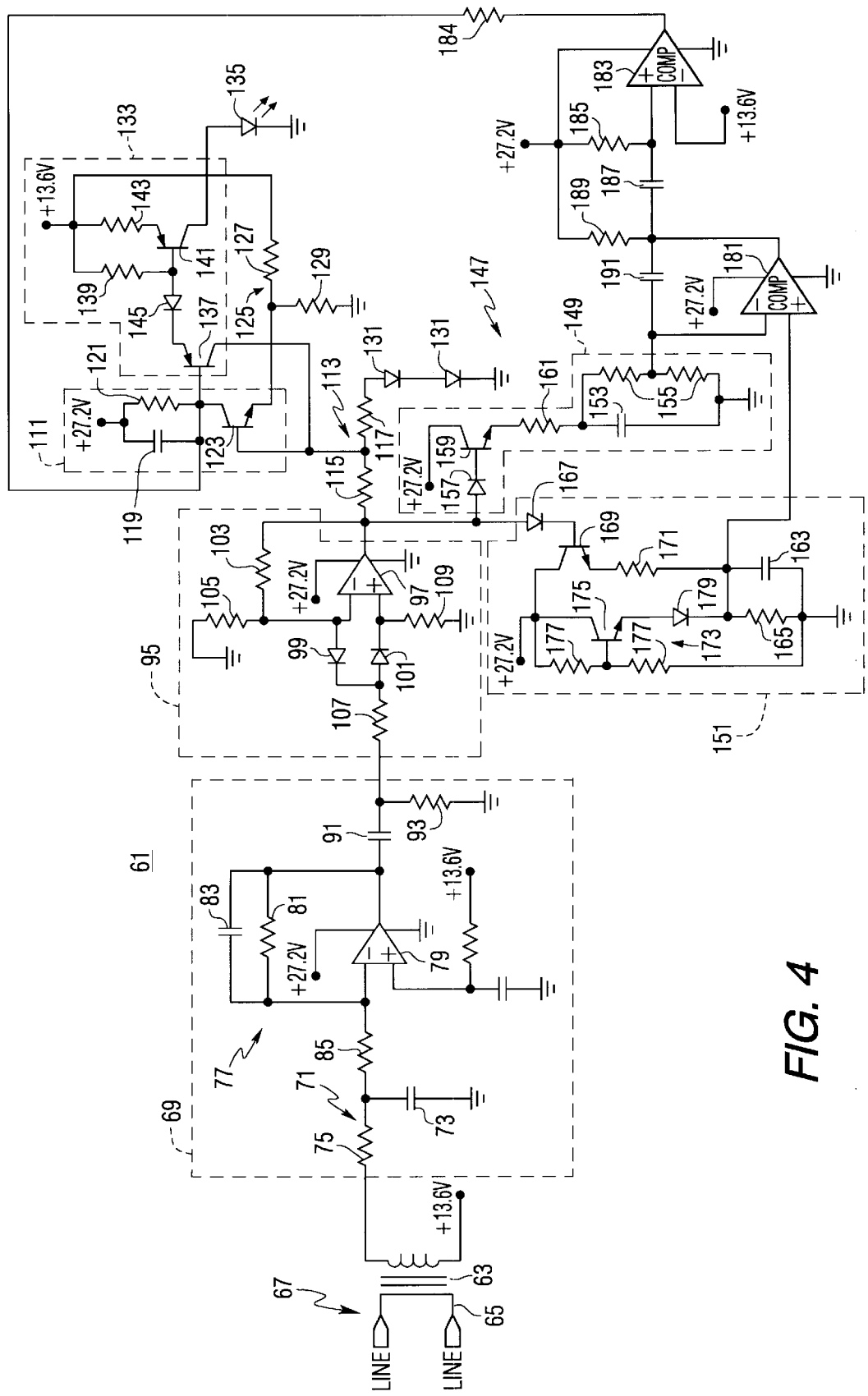
FIG. 4 is a schematic circuit diagram of an arcing fault detector in accordance with another embodiment of the invention.

FIG. 4 is a schematic circuit diagram of an arcing fault detector which incorporates the envelope detector into a detector which counts the number of step increases observed in a given time interval. The circuit 61 includes a current sensor in the form of the current transformer 63 which senses the current flowing in the conductor 65 of the ac electrical system 67 to generate a di/dt signal. This di/dt signal is passed through a signal conditioner circuit 69 which provides bandwidth limiting through a low pass filter 71 formed by the shunt capacitor 73 and series resistor 75. The signal conditioner 69 also includes a high pass filter 77 with amplification which includes the op amp 79 with feedback resistor 81 and capacitor 83 and input resistor 85. Low frequency roll-off implemented by the series capacitor 91 and shunt resistor 93 provides additional attenuation of 60 Hz from the sensed current signal.

The pulse signal representing the first derivative, di/dt, of the current signal output by the signal conditioner circuit 69 is full wave rectified by the rectifier circuit 95. This rectifier circuit 95 includes op amp 97 having oppositely poled diodes 99 and 101 applied to its inverting and non-inverting inputs resistors 103 and 105 providing a selected gain for positive pulses and resistors 107 and 109 setting the gain for negative pulses. Typically, these gains would be set equal as in a full wave rectifier.

The unipolar pulses output by the full wave rectifier 95 are applied to a time attenuated integration circuit 111 through a voltage divider 113 formed by resistors 115 and 117. The time attenuated integration circuit 111 includes a capacitor 119 shunted by a bleed resistor 121. The pulses from the full wave rectifier charge the capacitor 119 through turn on of a transistor 123. Only pulses which exceed a minimum threshold set by the voltage divider 125 formed by the resistors 127 and 129 are integrated. Diodes 131 provide temperature compensation for the transistor 123.

An output detector 133 actuates an output device 135 when the time attenuated integration represented by the voltage across the capacitor 119 reaches a predetermined level. The output device 135 may be a light emitting diode (LED) as shown, and/or may be a device such as a trip coil for a circuit breaker. When the voltage across the capacitor 119 reaches a level which drives the base voltage on the transistor 137 of the detector circuit low enough, the transistor is turned on. This draws current through resistor 139 which biases another transistor 141 on which then provides current through resistor 143 to actuate the output devise 135. A diode 145 protects the emitter to base junction of the transistor 137 when charge across the capacitor 119 is low and the base of the transistor is raised to near the +27.2 volt supply voltage for the capacitor.

The portions of the detector circuit 61 of FIG. 4 described to this point operate like the arcing fault detector described in U.S. Pat. application Ser. No. 08/471,132, filed on Jun. 6, 1995, U.S. Pat. No. 5,691,869. However, the circuit 61 also includes an envelope tracker 147 as described above. This envelope tracker 147 includes a first envelope tracking circuit 149 and a second envelope tracking circuit 151. The first envelope tracking circuit 149, which has the longer time constant, includes a capacitor 153 shunted by a pair of bleed resistors 155. Together the capacitor 153 and resistors 155 determine the time constant for the first envelope tracking circuit 149. In the illustrative circuit, this longer time constant is 40 milliseconds. The capacitor 153 is charged through a peak detector, which in the illustrative circuit is diode 157. When the pulses generated by the full wave rectifier 95 exceed the voltage on the capacitor 153, a transistor 159 is turned on to provide charge to the capacitor 153 through a current limiting resistor 161.

In a similar manner, the second envelope tracking circuit 151 includes a capacitor 163 shunted by a bleed resistor 165, which together set the time constant for the second tracking circuit. In the illustrative circuit, this second, shorter time constant is 12 milliseconds. When the amplitude of the full wave rectifier output pulses exceed the voltage on the capacitor 163, current passes through the peak detecting diode 167 to turn on a transistor 169 which provides charge to the capacitor 163 through the current limiting resistor 171. In addition, the second envelope tracking circuit 151 includes the circuitry 173 which fixes a minimum voltage on the capacitor 163. This circuit 173 includes a transistor 175, biasing resistors 177 and a diode 179. This sets a minimum amplitude of the envelope to which the envelope tracking circuit 147 will respond.

The voltages on the capacitors 153 of the first envelope tracking circuit and 163 of the second tracking circuit are compared in a comparator 181. As the voltage applied to the inverting input of the comparator 181 is taken at the node between the two resistors 155 shunting the capacitor 153, the values of these resistors set the fraction of the first tracking signal to which the second tracking signal is compared. In the example, the resistors 155 are of equal value so that the tracking signal generated by the second envelope tracking circuit 151 must fall below 50% of the amplitude of the first tracking signal to provide an output on the comparator 181. When the second tracking signal generated by the second envelope tracking circuit 151 exceeds 50% of the first tracking signal generated by the first envelope tracking circuit 149, the output of the comparator 181 is high. Under these conditions, the output of a second comparator 183 is also high because +27.2 volts is applied to its non-inverting input through a resistor 185 while plus 13.6 volts is applied to its inverting input. Under these conditions also, a capacitor 187 connected between the output of the comparator 181 and the non-inverting input of the comparator 183 is held discharged by the resistor 185 and a resistor 189. When the second tracking signal applied to the non-inverting input of the comparator 181 falls below ½ the amplitude of the first tracking signal, the output of the comparator 181 goes low. This results in rapid charging of the capacitor 187 which pulls the non-inverting input of the comparator 183 below the voltage on the inverting input to momentarily cause the output of comparator 183 to go low thereby applying a packet of charge to the capacitor 119 in the time attenuated integration circuit 111 through pull-up resistor 184. A feedback capacitor 191 around the comparator 181 provides stability for the pulse generating circuit. Thus, when the second envelope tracking signal falls below 50% of the first tracking signal a packet of charge is added to the time attenuated integration circuit thereby making this circuit more sensitive to the randomness of the discontinuities in the current signal. With this arrangement, it is possible to increase the sensitivity of the arc detecting circuit to arcing faults without increasing the sensitivity to false trips due to a dimmer.

Figure 5:
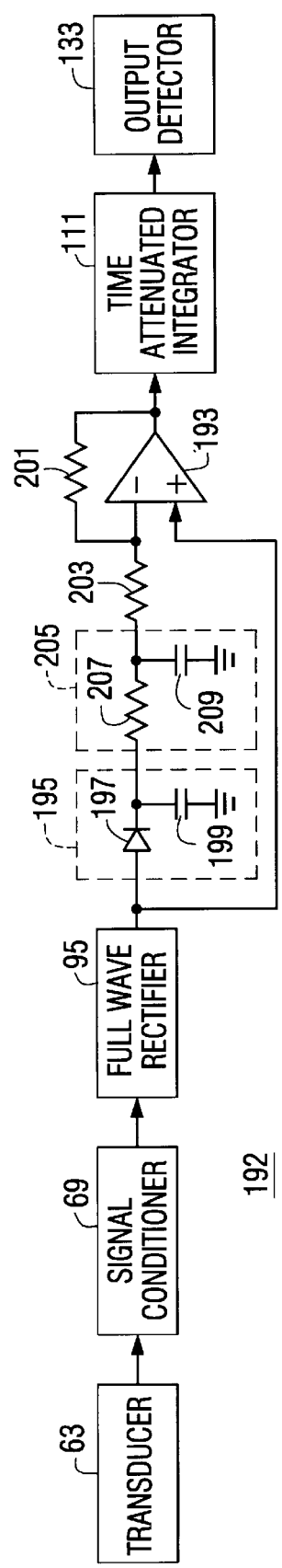
FIG. 5 is a schematic circuit diagram of an arcing fault detector in accordance with yet another embodiment of the invention.

FIG. 5 illustrates another embodiment of the invention which relies on the randomness of arcing faults to differentiate them from loads such as dimmers. This circuit 192 also generates a time attenuated accumulation of step increases caused by striking of an arc. Thus, the circuit 192 includes a transducer 63 such as a current transformer, a signal conditioner 69 which generates a bandwidth limited di/dt signal in the form of bipolar pulses, and a full wave rectifier 95 which generates unipolar pulses for each step increase in the load current above a predetermined magnitude. These pulses are applied through the non-inverting input of the differential amplifier 193 to the time attenuated integrator 111 to produce an arc detection signal in the output detector 133 when the time attenuated integrated value reaches a preset limit. In order to discriminate against regularly occurring step increases in the current such as would be generated by a dimmer, the circuit of 191 subtracts a proportion of the integrated value of the pulses representing a current envelope from each pulse. This is effectuated by a peak detector 195 formed by the diode 197 and capacitor 199. This integrated value is applied to the inverting input of the differential amplifier 193 so that it is subtracted from the magnitude of the latest pulse which is applied to the non-inverting input. The feedback resistor 201 and input resistor 203 determine the proportion of this envelope signal which is subtracted from the latest pulse. In order to prevent subtraction of the envelope from the first pulse detected by the circuit 191, a time-delay circuit 205 is interopposed between the detector 195 and the differential amplifier 193. This time-delay circuit is formed by the series resistor 207 and shunt capacitor 209. The capacitors 199 and 209 discharge through the resistors 201, 203 and, in the case of capacitor 199, the resistor 207 so that for randomly occurring pulses, less is subtracted by the differential amplifier 193 from the latest pulse and in the case of a dimmer in which the pulses are occurring every half-cycle and therefore maintaining charge on the capacitors 199 and 209. The result is, that the circuit 191 is much more sensitive to randomly occurring pulses of a rectified di/dt signal such as would occur with an arcing fault rather than the regularly occurring pulses produced by a dimmer.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Apparatus for detecting arcing faults in an ac electrical system, said apparatus comprising:

current sensing means generating current signal peak magnitudes representative of current flowing in said ac electrical system;

tracking means for tracking, detecting and storing an envelope of said current signal peak magnitudes; and response means generating an output signal indicating an arcing fault in said ac electrical system in response to randomness in said envelope of said peak magnitudes of said current signal, comprising means for comparing said peak magnitudes on a cycle to cycle basis.

2. The apparatus of claim 1 wherein said tracking means comprises means integrating said current signal to generate an envelope signal and said response means comprises means subtracting said envelope signal from said current signal to generate a difference signal, means generating a time attenuated integration of said difference signal, and means generating said output when said time attenuated integration reaches a predetermined value.

3. The apparatus of claim 2 wherein said current sensing means generates said current signal as a di/dt signal containing pulses representing step increases in said current, said means subtracting said envelope signal from said current signal generates difference pulses as said difference signal and said means generating a time attenuated integration of said difference signal generates a time attenuated accumulation of said difference pulses.

4. The apparatus of claim 3 wherein said means subtracting said envelope signal includes means preventing subtraction of said envelope signal from a first pulse in said di/dt signal.

5. The apparatus of claim 4 wherein said means preventing subtraction of said envelope signal from said first pulse comprises a time delay circuit.

6. Apparatus for detecting arcing faults in an ac electrical system, said apparatus comprising:

current sensing means generating a current signal representative of current flowing in said ac electrical system;

tracking means tracking an envelope of said current signal; and response means generating an output signal indicating an arcing fault in said ac electrical system in response to randomness in said envelope of said current signal, wherein said tracking means comprises first means tracking said current signal with a first time constant to generate a first tracking signal, and second means tracking said current signal with a second time constant which is shorter than said first time constant to generate a second tracking signal, and wherein said response means comprises comparison means comparing said first and second tracking signals and generating said output signal when said second tracking signal decays to a predetermined fraction of said first tracking signal.

7. The apparatus of claim 6 wherein said response means comprises means generating a count of times that said second tracking signal decays to said predetermined fraction of said first tracking signal and generating said output signal only after said count reaches a predetermined count within a predetermined time period.

8. The apparatus of claim 6 wherein said current sensing means comprises means generating a di/dt signal as said current signal.

9. The apparatus of claim 8 wherein said current sensing means further includes bandwidth limiting means bandwidth limiting said di/dt signal to produce pulses in response to the predetermined step increases in said current.

10. The apparatus of claim 6 wherein said current sensing means comprises means generating a di/dt signal containing pulses representing step increases in said current, said response means includes means generating a time attenuated accumulation of said pulses, means adding a signal to said time attenuated accumulation of pulses when said second tracking signal decays to said predetermined fraction of said first tracking signal and means generating said output signal when said time attenuated accumulation of pulses reaches a predetermined value.

11. Apparatus for detecting arcing faults in an ac electrical system, said apparatus comprising:

current sensing means generating a di/dt signal in the form of pulses in response to predetermined step increases in current in said ac electrical system;

means generating a time attenuated accumulation of said pulses and generating an output signal indicating an arcing fault when said time attenuated accumulation of said pulses exceeds a predetermined threshold value; and randomness detection means adding an additional pulse to said time attenuated accumulation of pulses in response to randomness in said pulses of said di/dt signal.

wherein said randomness detection means comprises first tracking means with a first time constant integrating said pulses to generate a first tracking signal, second tracking means with a second time constant shorter than said first time constant integrating said pulses to generate a second tracking signal, and means adding said additional pulse to said time attenuated accumulation of pulses when said second tracking signal falls to a selected fraction of said first tracking signal.

* * * * *